US008909448B2

(12) United States Patent
Nozu et al.

(10) Patent No.: US 8,909,448 B2
(45) Date of Patent: Dec. 9, 2014

(54) DRIVING FORCE DISTRIBUTION CONTROL DEVICE AND FOUR-WHEEL-DRIVE VEHICLE

(75) Inventors: Tomohiro Nozu, Anjo (JP); Ryohei Shigeta, Anjo (JP); Yasushi Yagi, Hiroshima (JP); Daisuke Kofu, Hiroshima (JP); Akihiro Tatara, Aki-gun (JP)

(73) Assignees: JTEKT Corporation, Osaka-shi (JP); Mazda Motor Corporation, Aki-gun (JP)

( * ) Notice: Subject to any disclaimer, the term of this patent is extended or adjusted under 35 U.S.C. 154(b) by 231 days.

(21) Appl. No.: 13/564,311

(22) Filed: Aug. 1, 2012

(65) Prior Publication Data

US 2013/0035832 A1 Feb. 7, 2013

(30) Foreign Application Priority Data

Aug. 1, 2011 (JP) .................................. 2011-168202

(51) Int. Cl.
*B60W 20/00* (2006.01)
*B60K 17/35* (2006.01)
*B60K 23/08* (2006.01)

(52) U.S. Cl.
CPC ............. *B60K 17/35* (2013.01); *B60K 23/0808* (2013.01); *B60K 2023/0858* (2013.01)
USPC ........................................... 701/69; 180/248

(58) Field of Classification Search
USPC .................... 701/69, 81, 89; 180/245–248
See application file for complete search history.

(56) References Cited

U.S. PATENT DOCUMENTS

| 5,373,912 | A | 12/1994 | Haiki et al. | |
| 5,894,904 | A * | 4/1999 | Yakou et al. | 180/247 |
| 7,784,577 | B2 * | 8/2010 | Yoneda | 180/197 |
| 7,877,184 | B2 * | 1/2011 | Watanabe et al. | 701/54 |
| 8,489,304 | B2 * | 7/2013 | Noguchi et al. | 701/90 |

FOREIGN PATENT DOCUMENTS

| DE | 40 15 701 A1 | 11/1990 |
| JP | 2001-277881 | 10/2001 |
| JP | 2004-306802 A | 11/2004 |

OTHER PUBLICATIONS

U.S. Appl. No. 13/564,329, filed Aug. 1, 2012, Nozu, et al.
U.S. Appl. No. 13/564,280, filed Aug. 1, 2012, Nozu, et al.
Extended European Search Report issued Dec. 10, 2012 in European Patent Application No. 12178802.0.

* cited by examiner

*Primary Examiner* — Dalena Tran
(74) *Attorney, Agent, or Firm* — Oblon, Spivak, McClelland, Maier & Neustadt, L.L.P.

(57) ABSTRACT

A driving force distribution control device, which is mounted on a vehicle including an engine configured to generate driving force for the vehicle, a transmission device configured to shift rotation of an output shaft of the engine by transmission ratios, and a driving force transmission system capable of transmitting output of the transmission device to main drive wheels and auxiliary drive wheels, includes: a control device configured to, when a rotational speed of the output shaft of the engine is in a range in which abnormal sound of the driving force transmission system due to pulsation of the driving force can be generated, set a torque value to a value capable of reducing the abnormal sound depending on the driving force; and a driving force transmitting device configured to transmit driving force depending on the set value to the auxiliary drive wheels.

6 Claims, 4 Drawing Sheets

DRIVING FORCE DISTRIBUTION CONTROL DEVICE AND FOUR-WHEEL-DRIVE VEHICLE

BACKGROUND OF THE INVENTION

The present invention relates to a driving force distribution control device that controls driving force to be distributed to an auxiliary drive wheel, and relates to a four-wheel-drive vehicle.

In the related art, there has been a driving force distribution control device which distributes driving force to an auxiliary drive wheel at a predetermined rate at which an abnormal vibration is not generated when a driving state of the four-wheel-drive vehicle is in an abnormal vibration generation region in which an abnormal sound due to the abnormal vibration caused by knocking of the engine is generated in a driving force transmission system (for example, Patent Document 1).

The driving force distribution control device disclosed in Patent Document 1 is configured so as to generate frictional torque suitable for mitigating the abnormal sound in a torque coupling when a vehicle speed exceeds a vibration generation lower limit speed and is less than a vibration generation upper limit speed. The frictional torque has a value higher than that in a case where the vehicle speed is not in the abnormal vibration generation region.

(Patent Document 1) JP-A-2001-277881

However, the abnormal sound from the driving force transmitting system is not limited to that caused by knocking, and can also be generated by pulsation (cyclic fluctuation) of torque of the engine. Furthermore, in order to improve fuel efficiency, when there is a small need to transmit driving force to the auxiliary drive wheel, for example, as in a straight constant speed running, it is desirable to reduce the driving force to be transmitted to the auxiliary drive wheel as far as possible to reduce the frictional torque in the driving force transmitting system. Thus, the present inventors have earnestly persisted in their research, focused on the fact that the engine torque is related to presence or absence of the generation of the abnormal sound, and found that, even if the number of revolutions of the engine is in a range in which the abnormal sound can be generated, the abnormal sound does not occur depending on a value of the engine torque and the driving force to be transmitted to the auxiliary drive wheel can be reduced in such a state.

SUMMARY

This invention provides a driving force distribution control device and a four-wheel-drive vehicle capable of suppressing deterioration of the fuel efficiency while suppressing the occurrence of abnormal sound.

An aspect of the invention provides a driving force distribution control device which is mounted on a four-wheel-drive vehicle including an engine configured to generate driving force for the vehicle, a transmission device configured to shift rotation of an output shaft of the engine by transmission ratios of a plurality of stages, and a driving force transmission system capable of transmitting output of the transmission device to main drive wheels which are one of front wheels and rear wheels and auxiliary drive wheels which are the other of the front wheels and the rear wheels, the driving force distribution control device comprising: a control device configured to, when a rotational speed of the output shaft of the engine is in a range in which abnormal sound of the driving force transmission system due to pulsation of the driving force can be generated, set a torque value to be transmitted to the auxiliary drive wheels to a value capable of reducing the abnormal sound depending on the driving force of the engine; and a driving force transmitting device configured to transmit driving force depending on the value set by the control device to the auxiliary drive wheels.

The control device may store relationship information indicating a relationship between the driving force of the engine and a value capable of reducing the abnormal sound for each of at least two of the transmission ratios of the plurality of stages, and set the torque value with reference to the relationship information corresponding to the transmission ratio of the transmission device during running.

The relationship information may be information that shows a relationship between the rotational speed of the output shaft of the engine, the driving force of the engine, and the value capable of reducing the abnormal sound.

An aspect of the invention provides a four-wheel-drive vehicle comprising: an engine configured to generate driving force for the vehicle; a transmission device configured to shift rotation of an output shaft of the engine by transmission ratios of a plurality of stages; a driving force transmission system capable of transmitting output of the transmission device to main drive wheels which are one of front wheels and rear wheels and auxiliary drive wheels which are the other of the front wheels and the rear wheels; a control device configured to, when a rotational speed of the output shaft of the engine is in a range in which abnormal sound of the driving force transmission system due to pulsation of the driving force can be generated, set a torque value to be transmitted to the auxiliary drive wheels to a value capable of reducing the abnormal sound depending on the driving force of the engine; and a driving force transmitting device configured to transmit driving force depending on the value set by the control device to the auxiliary drive wheels.

BRIEF DESCRIPTION OF THE DRAWINGS

FIGS. 2A and 2B illustrate examples of torque maps.

FIGS. 4A and 4B illustrate examples of torque maps according to a second embodiment of the present invention.

DETAILED DESCRIPTION OF EMBODIMENTS

First Embodiment

Figure 1:
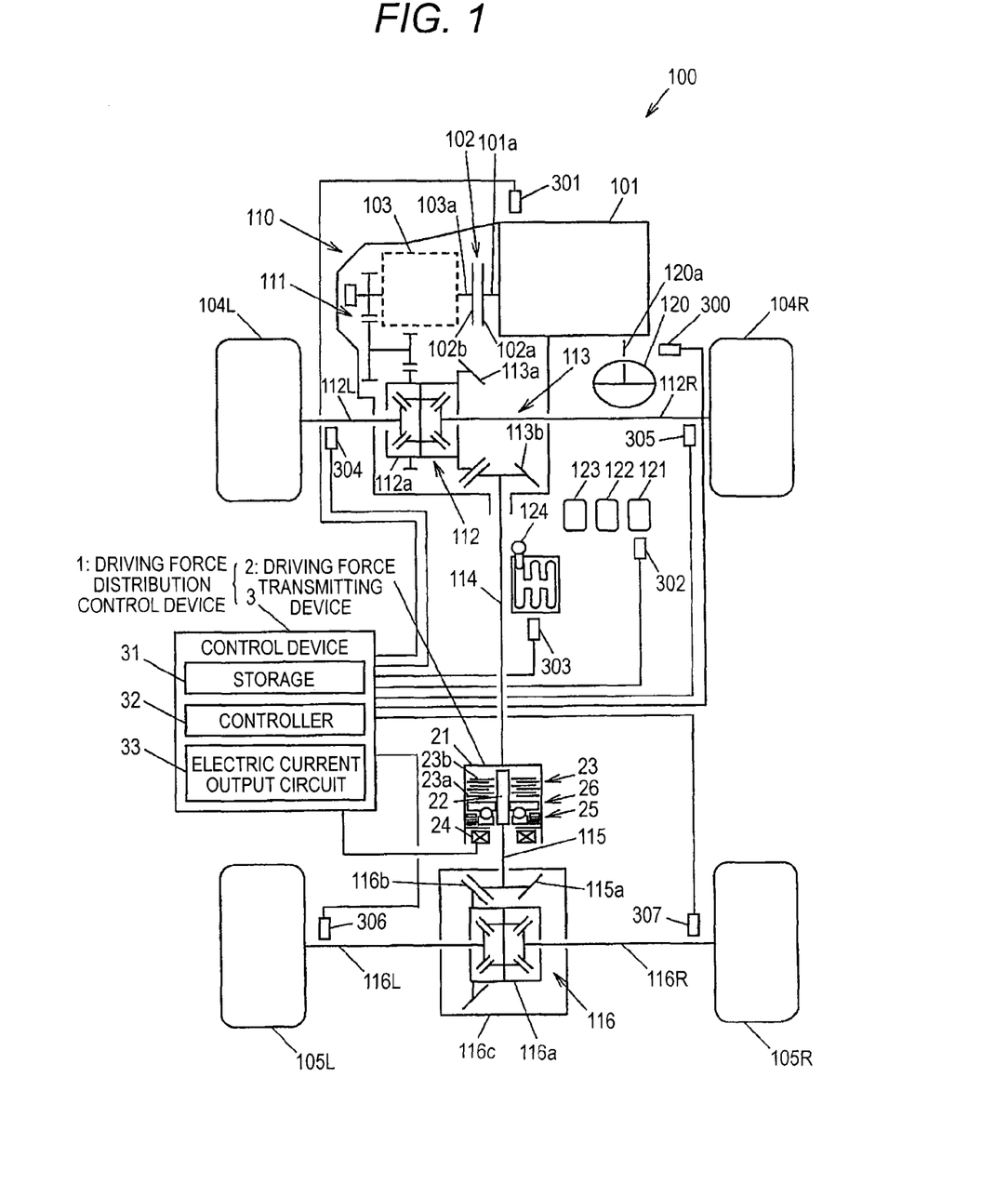
FIG. 1 is a schematic diagram that illustrates a configuration example of a four-wheel-drive vehicle according to a first embodiment of the present invention.

FIG. 1 is a schematic diagram that shows a configuration example of a four-wheel-drive vehicle according to an embodiment of the present invention. As shown in FIG. 1, a four-wheel-drive vehicle 100 is equipped with an engine 101 as a driving source, a transmission 103 as a gearbox that changes output of the engine 101, a clutch 102 which connects an output shaft 101a of the engine 101 and an input shaft 103a of the transmission 103, a driving force transmission system 110 which transmits output of the transmission 103 to a pair of left and right front wheels 104 (a left front wheels 104L and a right front wheels 104R) and a pair of left and right rear wheels 105 (a left rear wheels 105L and a right rear wheels 105R) so as to be switchable into a two-wheel-drive state and a four-wheel-drive state, and a driving force distribution control device 1. The driving force distribution control device 1 includes a driving force transmitting device 2 capable of adjusting transmission torque, and a control device 3 that controls the driving force transmitting device 2. The driving force transmitting device 2 is able to switch the running state of the four-wheel-drive vehicle 100 into the two-wheel-drive state and the four-wheel-drive state.

Furthermore, in a vehicle interior of the four-wheel-drive vehicle 100, for controlling the vehicle by a driver, a steering wheel 120, an accelerator pedal 121, a brake pedal 122, a clutch pedal 123, and a shift lever 124 are provided.

The engine 101 is an internal combustion engine which is supplied with fuel depending on an amount of depression of the accelerator pedal 121, and outputs driving force for causing the four-wheel-drive vehicle 100 to run, from the output shaft 101a connected to the clutch shaft.

The clutch 102 includes a first disc 102a connected to the output shaft 101a of the engine, and a second disc 102b connected to the input shaft 103a of the transmission 103. The output shaft 101a of the engine 101 is connected with the input shaft 103a of the transmission 103 by the frictional engagement between the first disc 102a and the second disc 102b.

The transmission 103 is a manual transmission that changes the gear ratio into a plurality of stages by the gear shift operation of a driver using the shift lever 124. The transmission 103 is, for example, 6-speed transmission capable of changing the gear ratio into six stages from a first speed to a sixth speed (during advancement).

(Configuration of Driving Force Transmission System)

The driving force transmission system 110 includes a front differential device 112 which distributes torque to the left front wheels 104L and the right front wheels 104R, a gear mechanism 111 which transmits torque of the output shaft of the transmission 103 to a differential case 112a of the front differential device 112, a transfer 113 which includes an input gear 113a connected to the differential case 112a and an output gear 113b having a rotational axis perpendicular to the input gear 113a and meshed with the input gear 113a, a propeller shaft 114 connected to the output gear 113b, a driving force transmitting device 2, a pinion gear shaft 115 to which torque of the propeller shaft 114 is transmitted via the driving force transmitting device 2, and a rear differential device 116 which distributes torque transmitted to the pinion gear shaft 115 into the left rear wheels 105L and the right rear wheels 105R.

Furthermore, the driving force transmission system 110 includes drive shafts 112L and 112R respectively connected to a pair of side gears of the front differential device 112, and drive shafts 116L and 116R respectively connected to a pair of side gears of the rear differential device 116. The drive shafts 112L and 112R transmit torque to the left front wheel 104L and the right front wheel 104R, and the drive shafts 116L and 116R transmit torque to the left rear wheel 105L and the right rear wheel 105R.

A ring gear 116b is provided on an outer peripheral portion of the differential case 116a of the rear differential device 116 in a relatively non-rotatable manner. The ring gear 116b is meshed with the gear part 115a of the pinion gear shaft 115 and transmits torque from the pinion gear shaft 115 to the differential case 116a.

Among the respective components of the driving force transmission system 110 mentioned above, the transfer 113, the propeller shaft 114, the pinion gear shaft 115, the rear differential device 116, and the drive shafts 116L and 116R are an example of a driving force transmitting member that transmits driving force of the engine 101 to the rear wheels 105.

In the driving force transmission system 110, during running, torque output from the transmission 103 is always transmitted to the left front wheel 104L and the right front wheel 104R by the configuration mentioned above. Furthermore, torque is transmitted to the left rear wheel 105L and the right rear wheel 105R by the operation of the driving force transmitting device 2 depending on the running state of the four-wheel-drive vehicle 100 when required. That is, in the four-wheel-drive vehicle 100 of the present embodiment, the left front wheel 104L and the right front wheel 104R are main drive wheels and the left rear wheel 105L and the right rear wheel 105R are auxiliary drive wheels.

(Configuration of Control Device)

The control device 3 constituting the driving force distribution control device 1 includes a storage 31 constituted by a ROM, a RAM or the like, a controller 32 constituted by a calculation processing device such as a CPU, and an electric current output circuit 33 controlled by the controller 32. The controller 32 is operated based on program stored in the storage 31, and thus, the control device 3 obtains a value of command torque to be transmitted to the rear wheels 105 by the calculation, based on a rotation difference between the front wheels 104 and the rear wheels 105 of the four-wheel-drive vehicle 100, the output torque of the engine 101, the selected gear stage of the transmission 103, the final reduction ratio in the driving force transmission system 110, the steering angle by the operation of the steering wheel 120 or the like.

The electric current output circuit 33 supplies electric current depending on the command torque obtained by the calculation processing of the controller 32 to the driving force transmitting device 2. The electric current output circuit 33 is, for example, an inverter circuit that outputs electric current to be supplied from a battery (not shown) by adjusting an amount of electric current using a PWM (Pulse Width Modulation) control.

Detection signals of a steering angle sensor 300 for detecting the rotation of the steering shaft 120a connected to the steering wheel 120, an engine rotational speed sensor 301 for detecting the rotational speed (the number of revolutions per a time) of the output shaft 101a of the engine 101, an accelerator opening degree sensor 302 for detecting an accelerator opening degree (an amount of acceleration operation) depending on an amount of depression of the accelerator pedal 121, and a shift position sensor 303 for detecting the position of the shift lever 124 are input to the control device 3.

Furthermore, detection signals of vehicle wheel speed sensors 304 to 307, which are respectively provided for the left front wheel 104L, the right front wheel 104R, the left rear wheel 105L, and the right rear wheel 105R to detect the rotational speed of each of the wheels, are input to the control device 3.

The detection signals of the respective sensors 300 to 307 may be directly input to the control device 3 via signal lines connected to the sensor main body, and may be input to the control device 3 by communication through an in-vehicle network such as a CAN (Controller Area Network).

(Configuration of Driving Force Transmitting Device 2)

The driving force transmitting device 2 includes a cylindrical outer housing 21 with a bottom, which is connected to the propeller shaft 114, a cylindrical inner shaft 22 connected to the pinion gear shaft 115, and a main clutch 23 formed of a plurality of frictional plates arranged between the inner peripheral surface of the outer housing 21 and the outer peripheral surface of the inner shaft 22. The main clutch 23 is constituted by alternately arranging a plurality of outer clutch plates 23a spline-fitted to the outer housing 21 in a relatively non-rotatable manner, and a plurality of inner clutch plates 23b spline-fitted to the inner shaft 22 in a relatively non-rotatable manner.

Furthermore, between the outer housing 21 and the inner shaft 22, an annular electromagnetic coil 24 for generating pressing force axially pressing the main clutch 23, a pilot clutch 25 pressed by electromagnetic force of the electromagnetic coil 24, and a cam mechanism 26 for converting rotational force transmitted via the pilot clutch 25 into axial thrust force pressing the main clutch 23 are arranged.

Excitation current is supplied from the electric current output circuit 33 (see FIG. 1) of the control device 3 to the electromagnetic coil 24. When excitation current is supplied to the electromagnetic coil 24, rotational force of the outer housing 21 is transmitted to the cam mechanism 26 via the pilot clutch 25 by the electromagnetic force of the electromagnetic coil 24, and thrust force pressing the main clutch 23 is generated by operation of the cam mechanism 26. As a result, driving force transmitted from the outer housing 21 to the inner shaft 22 is changed depending on excitation current supplied to the electromagnetic coil 24.

(Function of Control Device)

The control device 3 controls an amount of transmission of torque of the driving force transmitting device 2 by adjusting the excitation current to be supplied to the excitation coil 24. The control device 3 has a normal control function of calculating a torque value to be transmitted to the rear wheels 105 based on the rotational speed difference between the front and rear wheels, the output torque of the engine 101, the selected gear stage of the transmission 103, the final reduction ratio in the driving force transmission system 110, the steering angle by the operation of the steering wheel 120 or the like, and supplying the excitation current depending on the calculated torque value to the electromagnetic coil 24 of the driving force transmitting device 2.

Furthermore, the control device 3 has an abnormal sound countermeasure control function of setting the torque value to be transmitted to the rear wheels 105 as a value capable of reducing the abnormal sound of the driving force transmission system 110 due to pulsation of driving force of the engine 101, when the gear stage of the transmission 103 selected by the operation of the shift lever 124 by a driver is a predetermined gear stage, and the rotational speed of the output shaft 101a of the engine 101 is in a predetermined range of a rotational speed. Hereinafter, specific examples of the normal control function and the abnormal sound countermeasure control function will be described.

(Normal Control Function)

The controller 32 of the control device 3 calculates the command torque tc by the sum of a first torque t1 based on a rotational speed difference between the front wheels 104 and the rear wheels 105, a second torque t2 based on the output torque of the engine 101 and the selected gear stage of the transmission 103 or the like, and a third torque t3 based on the steering angle.

In the calculation of the first torque t1, a rotational speed Vf (an average rotational speed of the left and right front wheels 104L and 104R) of the front wheels 104 is calculated based on the detection signals of the vehicle wheel speed sensors 304 and 305 respectively provided for the left and right front wheels 104L and 104R, and a rotational speed Vr (an average rotational speed of the left and right rear wheels 105L and 105R) of the rear wheels 105 is calculated based on the detection signals of the vehicle wheel speed sensors 306 and 307 respectively provided for the left and right rear wheels 105L and 105R. Moreover, a rotational speed difference $\Delta V$ ($\Delta V = Vf - Vr$) between the front and rear wheels is obtained by subtracting the rotational speed Vr of the rear wheels 105 from the rotational speed Vf of the front wheels 104.

Moreover, the first torque t1 is obtained with reference to a first torque map, stored in the storage 31, indicating a relationship between the rotational speed difference $\Delta V$ and the first torque t1. The first torque map is set so that the greater the rotational speed difference $\Delta V$, the greater the first torque t1. As a result, for example, when a slip occurs in the left front wheel 104L or the right front wheel 104R, it is possible to distribute a larger proportion of the driving force of the engine 101 to the rear wheels 105 to suppress the slip. In addition, the first torque t1 may be changed by the vehicle speed S. The vehicle speed S can be obtained, for example, by multiplying the sum of the rotational speed Vf of the front wheels 104 and the rotational speed Vr of the rear wheels 105 by a predetermined factor.

In the calculation of the second torque t2, the second torque t2 is obtained with reference to a second torque map, stored in the storage 31, indicating a relationship between the second torque t2 and the sum (drive torque) of torque transmitted to the left and right front wheels 104L and 104R and the left and right rear wheels 105L and 105R. The drive torque can be obtained by the calculation, for example, based on the output torque of the engine 101, the selected gear stage of the transmission 103, and the final reduction ratio in the driving force transmission system 110.

The second torque map is set so that, when the drive torque is less than a predetermined value, the second torque t2 is increased depending on an increase of the drive torque or is a constant value, and when the drive torque is equal to or greater than the predetermined value, the second torque t2 is increased depending on an increase of the drive torque by an increasing ratio greater than that in a case where the drive torque is less than the predetermined value. The predetermined value is a value that is set depending on a grip limit torque of the left and right front wheels 104L and 104R.

As a result, for example, the great driving force of the engine 101 at the time of the sudden acceleration is uniformly distributed to the front wheels 104 and the rear wheels 105, and thus it is possible to avoid the slip of the left front wheel 104L or the right front wheel 104R that can occur when the driving force is concentrated on the left and right front wheels 104L and 104R serving as main drive wheels. In addition, the second torque t2 may be further changed by the vehicle speed S.

In the calculation of the third torque t3, the steering angle of the steering shaft 120a is detected from the detection signal of the steering angle sensor 300, and the third torque t3 is obtained with reference to a third torque map, stored in the storage 31, indicating a relationship between the steering angle and the third torque t3. The third torque map is set so that, the greater the steering angle is, the greater the third torque t3 is.

As a result, it is possible to suppress the deterioration of the fuel efficiency by stabilizing the vehicle behavior of the four-wheel-drive vehicle 100 at the time of the rotation with the great steering angle and by reducing the command torque tc to be transmitted to the rear wheels serving as the auxiliary drive wheels at the time of the rotation with the small steering angle and at the time of the straight advancement. In addition, the third torque t3 may be further changed by the vehicle speed S.

(Abnormal Sound Countermeasure Control Function)

Furthermore, the controller 32 of the control device 3 suppresses the occurrence of abnormal sound by transmitting torque to the rear wheels 105 when the gear stage of the transmission 103 and the rotational speed of the output shaft 101a of the engine 101 are in a state where the abnormal sound can occur from the driving force transmission system 110 by the pulsation of the driving force of the engine 101.

Generally, since the engine serving as an internal combustion engine repeats a suction stroke, a compression stroke, an explosion stroke and an exhaust stroke, and generates driving force in the explosion stroke, the driving force output from the engine is always pulsated even if the opening degree of the accelerator is constant. The cycle of the pulsation is changed depending on the rotational speed of the engine, and the lower the rotational speed is, the longer the cycle is. As a result, torque to be transmitted to the rear wheels is near zero, and in the two-wheel driving state in which the driving force is substantially transmitted only to the front wheels, when the engine is in the row rotation state, there is a possibility that the abnormal sound (gear rattling sound) is generated from the gear meshing portion in the transfer and the rear differential device.

The controller 32 of the control device 3, by transmitting torque to the rear wheels 105 even in the two-wheel driving state, presses the driving force transmitting members with each other for transmitting the driving force of the engine 101 to the rear wheels 105 so that the gear meshing direction in the transfer 113 and the rear differential device 116 is not changed, that is, so that the switch-over of the contact state and the non-contact state between the gear teeth are not repeated, thereby to reduce the abnormal sound.

Furthermore, the controller 32 changes torque to be transmitted to the rear wheels 105 depending on the driving force which is output from the engine 101. The driving force of the engine 101 (the driving force that is output from the engine) is an engine torque that is calculated and output by the calculation device of the four-wheel-drive vehicle 100 based on the detection result of the state of the engine 101. The driving force of the engine 101 may be calculated, for example, based on the accelerator opening degree detected by the accelerator opening degree sensor 302, or may be obtained with reference to information acquired from the control device of the engine 101.

The control device 3 stores relationship information indicating a relationship between the driving force of the engine 101, the number of revolutions (the rotational speed of the output shaft 101a) of the engine 101, and a torque value capable of reducing the abnormal sound (hereinafter, the torque value is referred to as a "abnormal sound reduction torque td"), in the storage 31 as a three-dimensional torque map. In the present embodiment, with respect to two gear stages (a fifth speed and a sixth speed) for high-speed running among six gear stages of the transmission 103, the torque maps are stored.

Figure 2A:
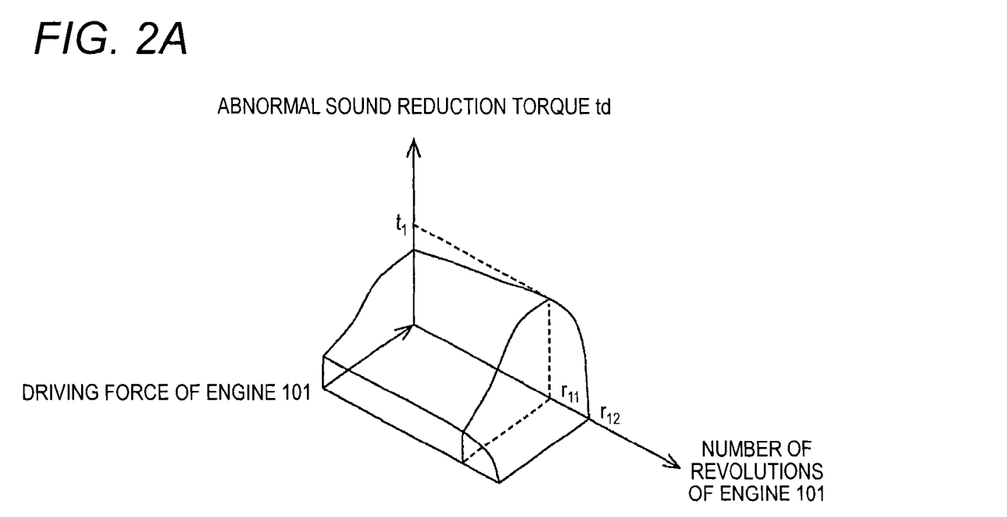
FIG. 2A is a torque map of a case where the selected gear stage is fifth speed.
Figure 2B:
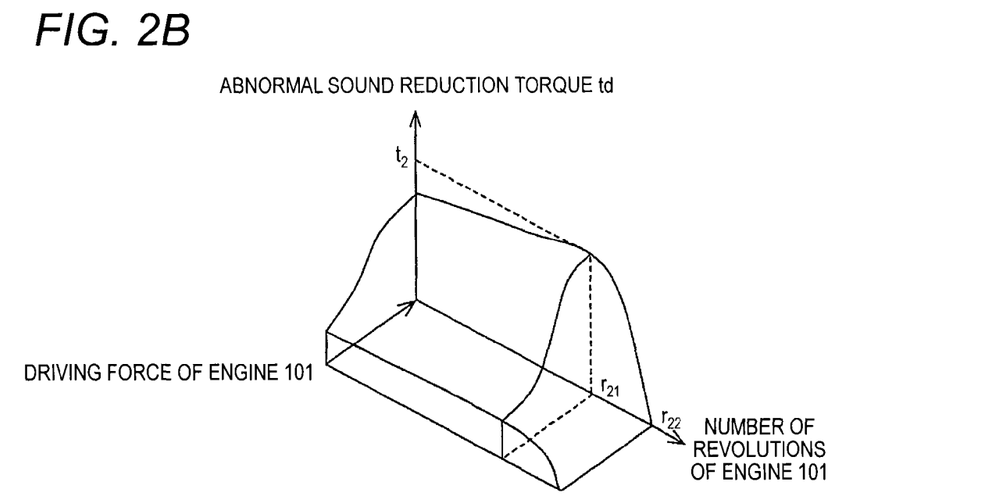
FIG. 2B is a torque map of a case where the selected gear stage is sixth speed.

FIGS. 2A and 2B indicate examples of the torque maps, FIG. 2A is a torque map of a case where the selected gear stage is the fifth speed, and FIG. 2B is a torque map of a case where the selected gear stage is the sixth speed.

When the fifth speed is selected, as shown in FIG. 2A, when the number of revolutions of the engine 101 is equal to or less than $r_{12}$ (2000 rpm), the abnormal sound countermeasure control is performed, and the abnormal sound reduction torque td becomes a peak value ($t_1$) in $r_{11}$ (1500 rpm). Furthermore, the abnormal sound reduction torque td is also changed by the driving force of the engine 101, and the value thereof is increased along with an increase of the driving force of the engine 101.

Furthermore, when the sixth speed is selected, as shown in FIG. 2B, when the number of revolutions of the engine 101 is equal to or less than $r_{22}$ (2500 rpm), the abnormal sound countermeasure control is performed, and the abnormal sound reduction torque td becomes a peak value ($t_2$) in $r_{21}$ (2000 rpm). That is, the number of revolutions $r_{22}$ of the engine 101 which is a threshold value for determining whether or not to perform the abnormal sound countermeasure control, and the number of revolutions $r_{21}$ of the engine 101 in which the abnormal sound reduction torque td becomes the peak value are greater than those in the case of the fifth speed ($r_{12}$ and $r_{11}$). Furthermore, similarly to the case of the fifth speed, the abnormal sound reduction torque td is changed by the driving force of the engine 101 and the value thereof is increased along with an increase of the driving force of the engine 101. Furthermore, the peak value ($t_2$) of the abnormal sound reduction torque td in the case where the sixth speed is selected is a value greater than the peak value ($t_1$) of the abnormal sound reduction torque td in the case where the fifth speed is selected.

In this manner, the torque map can be constructed by changing the driving force of the engine 101, the number of revolutions of the engine 101, and the transmission torque to the rear wheels 105 and measuring presence or absence of the abnormal sound.

(Processing Sequence of Control Device)

Figure 3:
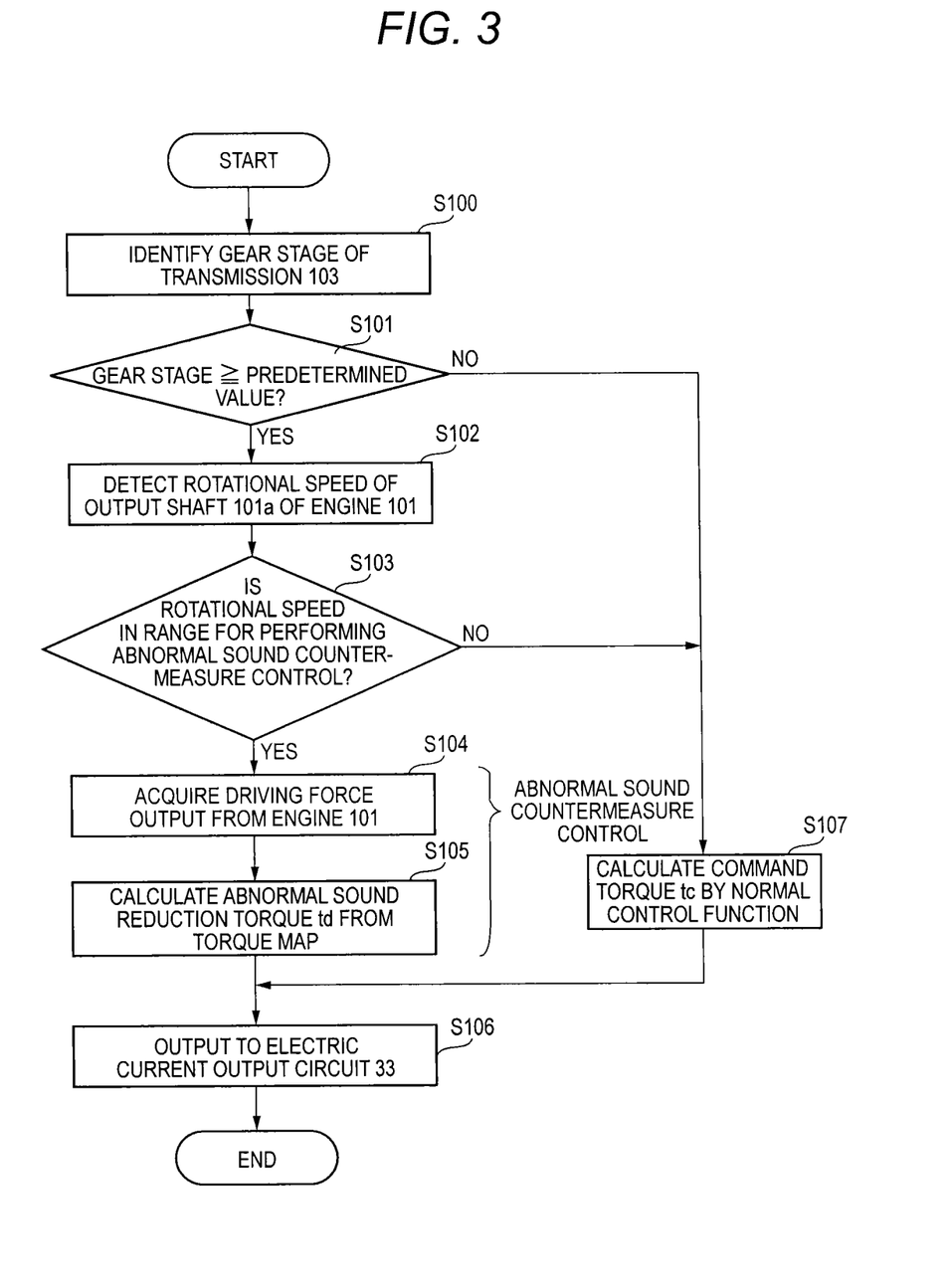
FIG. 3 is a flow chart that illustrates an example of processing carried out by a controller of a control device.

FIG. 3 is a flow chart that illustrates an example of processing carried out by the controller 32 of the control device 3. The controller 32 repeatedly carries out the processing shown in the flow chart for each predetermined control cycle (for example, 100 ms).

Firstly, the controller 32 identifies the gear state of the transmission 103 selected by the operation of the shift lever 124 based on the detection signal of the shift position sensor 303 (step S100), and determines whether or not the gear stage is equal to or greater than a predetermined value (the fifth speed in the present embodiment) (step S101).

When the gear stage is equal to or greater than a predetermined value (S101: Yes) as a result of the determination, the controller 32 detects the rotational speed of the output shaft 101a of the engine 101 (step S102) based on the detection signal of the engine rotational speed sensor 301, and determines whether or not the rotational speed of the output shaft 101a is in a range of a rotational speed for performing the abnormal sound countermeasure control (step S103). As a consequence of the determination, when the rotational speed of the output shaft 101a is in the range of the rotational speed for performing the abnormal sound countermeasure control (step S103: Yes), the abnormal sound countermeasure control (steps S104 and S105) is performed. In the present embodiment, when the gear stage is the fifth speed, the abnormal sound countermeasure control is performed when the rotational speed of the engine 101 is equal to or less than $r_{12}$ (2000 rpm), and when the gear stage is the sixth speed, the abnormal sound countermeasure control is performed when the rotational speed of the engine 101 is equal to or less than $r_{22}$ (2500 rpm).

When the abnormal sound countermeasure control is performed (step S103: Yes), the controller 32 acquires the driving force that is output from the engine 101 (step S104), and calculates the abnormal sound reduction torque td with reference to the torque map stored in the storage 31, based on the rotational speed of the output shaft 101a of the engine 101 detected in step S102 and the driving force output from the engine 101 acquired in step S104 (step S105). Moreover, the controller 32 sets the abnormal sound reduction torque td to the command torque tc, outputs the same to the electric current output circuit 33 (step S106), and finishes the processing.

Meanwhile, when the gear stage is not equal to or greater than the predetermined value (S101: No) or when the rotational speed of the output shaft 101a of the engine 101 is not in the range of the rotational speed for performing the abnormal sound countermeasure control (S103: No), the controller 32 obtains the command torque tc by the normal control function (step S107), outputs the command torque tc to the electric current output circuit 33 (step S106), and finishes the processing.

(Function and Effect of First Embodiment)

According to the first embodiment mentioned above, when the rotational speed of the engine 101 is in the range of the rotational speed in which the abnormal sound of the driving force transmission system 101 due to the pulsation of the driving force can be generated, the command torque tc is set to a value capable of reducing the abnormal sound. Since the command torque tc of this case is set depending on the driving force that is output from the engine 101, unnecessary torque is not transmitted to the rear wheels 105, and it is possible to suppress the deterioration of the fuel efficiency while suppressing the generation of the abnormal sound.

Second Embodiment

Next, a second embodiment of the present invention will be described with reference to FIGS. 4A and 4B. In the first embodiment, the abnormal sound reduction torque td is obtained with reference to the three-dimensional torque map indicating the relationship information showing the relationship between the driving force of the engine 101, the number of revolutions of the engine 101, and the abnormal sound reduction torque td. In the present embodiment, the abnormal sound reduction torque td is obtained with reference to a two-dimensional torque map indicating the relationship information showing the relationship between the driving force of the engine 101 and the abnormal sound reduction torque td. The sequence of the processing carried out by the controller 32 in the present embodiment is the same as that of the first embodiment described with reference to the flow chart of FIG. 3.

Figure 4A:
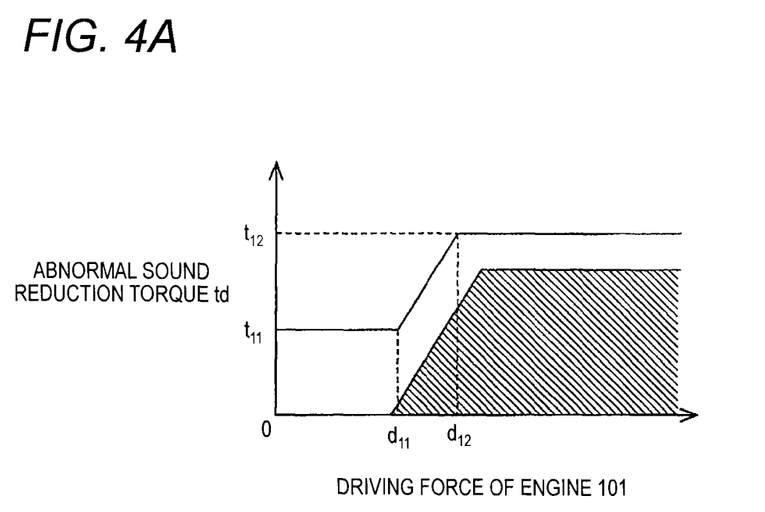
FIG. 4A is a torque map of a case where the selected gear stage is fifth speed.
Figure 4B:
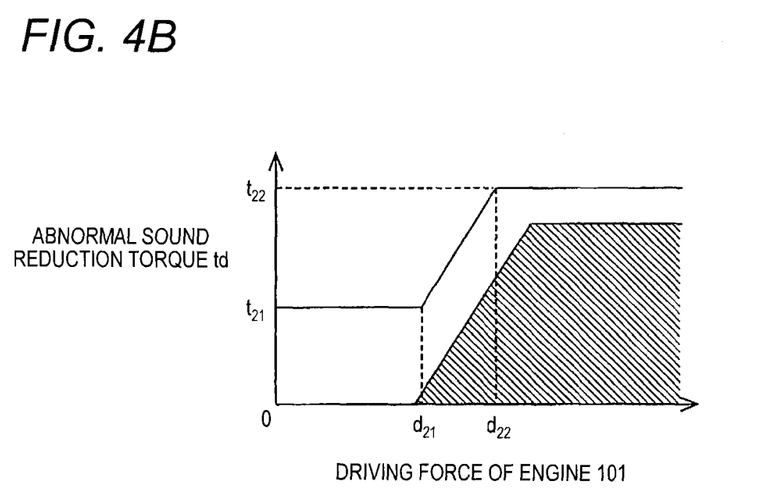
FIG. 4B is a torque map of a case where the selected gear stage is sixth speed.

FIGS. 4A and 4B illustrate examples of torque maps according to the present embodiment, FIG. 4A illustrates a torque map of a case where the selected gear stage is the fifth speed, and FIG. 4B illustrates a torque map of a case where the selected gear stage is the sixth speed.

When the fifth speed is selected, the abnormal sound countermeasure control is performed when the number of revolutions of the engine 101 is, for example, 2000 rpm, and the abnormal sound reduction torque td is obtained based on the driving force of the engine 101. In the example shown in FIG. 4A, when the driving force of the engine 101 is in the range equal to or less than $d_{11}$ (5% of the maximum output of the engine 101), the abnormal sound reduction torque td is $t_{11}$, and when the driving force of the engine 101 is in the range of $d_{11}$ to $d_{12}$ (20% of the maximum output of the engine 101), the abnormal sound reduction torque td is simply increased from $t_{11}$ to $t_{12}$ ($t_{12} > t_{11}$) along with an increase of the driving force of the engine 101. When the driving force of the engine 101 is in the range equal to or greater than $d_{12}$, the abnormal sound reduction torque td is constantly $t_{12}$.

Furthermore, when the sixth speed is selected, the abnormal sound countermeasure control is performed when the number of revolutions of the engine 101 is, for example, 2500 rpm. In the example shown in FIG. 4B, when the driving force of the engine 101 is in the range equal to or less than $d_{21}$ (10% of the maximum output of the engine 101), the abnormal sound reduction torque td is $t_{21}$, and when the driving force of the engine 101 is in the range of $d_{21}$ to $d_{22}$ (30% of the maximum output of the engine 101), the abnormal sound reduction torque td is simply increased from $t_{21}$ to $t_{22}$ ($t_{22} > t_{21}$) along with an increase of the driving force of the engine 101. When the driving force of the engine 101 is in the range equal to or greater than $d_{22}$, the abnormal sound reduction torque td is constantly $t_{22}$.

Furthermore, $t_{21}$ is greater than $t_{11}$ and $t_{22}$ is greater than $t_{12}$. Furthermore, $d_{21}$ is greater than $d_{11}$ and $d_{22}$ is greater than $d_{12}$. In this manner, when the sixth speed is selected, the abnormal sound reduction torque td is greater than that in the case where the fifth speed is selected.

Furthermore, an oblique line portion shown in each of FIGS. 4A and 4B indicates a region where the abnormal sound is generated in the driving force transmission system 110. As shown in FIGS. 4A and 4B, in the abnormal sound reduction torque td, the torque map is set so as to exceed the region. That is, the abnormal sound reduction torque td is set to a value capable of reducing the abnormal sound of the driving force transmission system 110.

Another Embodiment

As mentioned above, although the driving force distribution control device and the four-wheel-drive vehicle of the present invention have been based on the respective embodiments mentioned above, the present invention is not limited to the embodiments mentioned above but can be carried out in various forms without departing from the gist thereof.

For example, in the respective embodiments mentioned above, although the abnormal sound countermeasure control is performed when the gear stage is the fifth speed or the sixth speed, for example, the abnormal sound countermeasure control may be performed when the gear stage is the fourth speed to the sixth speed or the third speed to the sixth speed without being limited thereto. In this case, it is desirable to store the different torque maps for each gear stage. Furthermore, the number of the gear stage of the transmission 103 may be four or five.

Furthermore, in the respective embodiments mentioned above, a case has been described where the abnormal sound reduction torque td is increased as much as the driving force of the engine 101 is great to suppress the occurrence of the abnormal sound. However, the value of the abnormal sound reduction torque td can be suitably set based on the test or the like depending on properties of the four-wheel-drive vehicle 100, without being limited thereto. For example, the abnormal sound reduction torque td may be decreased as much as the driving force of the engine 101 is great to suppress the occurrence of the abnormal sound. Alternatively, when the driving force of the engine 101 is in a predetermined range, the abnormal sound reduction torque td is increased as much as the driving force of the engine 101 is great, and when the driving force is in another predetermined range, the abnormal sound reduction torque td may be decreased as much as the driving force of the engine 101 is great.

Furthermore, in the respective embodiments mentioned above, although a case has been described where the front wheels 104 are the main drive wheels, and the rear wheels 105 are the auxiliary drive wheels, the present invention can also be applied to a four-wheel-drive vehicle in which the front wheels 104 are the auxiliary drive wheels, and the rear wheels 105 are the main drive wheels, without being limited thereto.

According to an aspect of the invention, it is possible to suppress the deterioration of the fuel efficiency while suppressing the occurrence of the abnormal sound.

What is claimed is:

1. A driving force distribution control device which is mounted on a four-wheel-drive vehicle including an engine configured to generate driving force for the vehicle, a transmission device configured to shift rotation of an output shaft of the engine by transmission ratios of a plurality of stages, and a driving force transmission system capable of transmitting output of the transmission device to main drive wheels which are one of front wheels and rear wheels and auxiliary drive wheels which are the other of the front wheels and the rear wheels so as to be switchable into a two-wheel-drive state and a four-wheel-drive state, the driving force distribution control device comprising:

a control device configured to, when a rotational speed of the output shaft of the engine is in a range in which abnormal sound of the driving force transmission system due to pulsation of the driving force can be generated, set a torque value to be transmitted to the auxiliary drive wheels to a value capable of reducing the abnormal sound depending on the driving force of the engine; and a driving force transmitting device configured to transmit driving force depending on the value set by the control device to the auxiliary drive wheels.

2. The driving force distribution control device according to claim 1, wherein the control device stores relationship information indicating a respective relationship between the driving force of the engine and a value capable of reducing the abnormal sound for each of at least two of the transmission ratios of the plurality of stages, and sets the torque value with reference to the relationship information corresponding to the transmission ratio of the transmission device during running.

3. The driving force distribution control device according to claim 2,
wherein the relationship information is information that shows a relationship between the rotational speed of the output shaft of the engine, the driving force of the engine, and the value capable of reducing the abnormal sound.

4. The driving force distribution control device according to claim 1, wherein, as the driving force generated by the engine is larger, the control device sets the value to be larger.

5. A four-wheel-drive vehicle comprising:

an engine configured to generate driving force for the vehicle;

a transmission device configured to shift rotation of an output shaft of the engine by transmission ratios of a plurality of stages;

a driving force transmission system capable of transmitting output of the transmission device to main drive wheels which are one of front wheels and rear wheels and auxiliary drive wheels which are the other of the front wheels and the rear wheels so as to be switchable into a two-wheel-drive state and a four-wheel drive state;

a control device configured to, when a rotational speed of the output shaft of the engine is in a range in which abnormal sound of the driving force transmission system due to pulsation of the driving force can be generated, set a torque value to be transmitted to the auxiliary drive wheels to a value capable of reducing the abnormal sound depending on the driving force of the engine; and a driving force transmitting device configured to transmit driving force depending on the value set by the control device to the auxiliary drive wheels.

6. The four-wheel-drive vehicle according to claim 4, wherein, as the driving force generated by the engine is larger, the control device sets the value to be larger.

* * * * *